(12) United States Patent
Fong et al.

(10) Patent No.: US 11,178,113 B2
(45) Date of Patent: Nov. 16, 2021

(54) PROTOCOL ISOLATION FOR SECURITY

(71) Applicant: PPIP LLC, Tempe, AZ (US)

(72) Inventors: Michael Fong, Tempe, AZ (US); Neric Hsin-Wu Fong, Tempe, AZ (US); Ryan Mark Speers, Silver Spring, MD (US); Mohamad Ahmad Foustok, Parkland, FL (US)

(73) Assignee: PPIP, LLC, Chandler, AZ (US)

( * ) Notice: Subject to any disclaimer, the term of this patent is extended or adjusted under 35 U.S.C. 154(b) by 289 days.

(21) Appl. No.: 16/526,571

(22) Filed: Jul. 30, 2019

(65) Prior Publication Data

US 2021/0036989 A1    Feb. 4, 2021

(51) Int. Cl.
*H04L 29/06* (2006.01)
*H04W 4/80* (2018.01)

(52) U.S. Cl.
CPC ........ *H04L 63/029* (2013.01); *H04L 63/1441* (2013.01); *H04L 69/08* (2013.01); *H04W 4/80* (2018.02)

(58) Field of Classification Search
CPC ... H04L 63/029; H04L 63/1441; H04L 63/18; H04L 69/08; H04L 69/18; H04W 4/80
See application file for complete search history.

(56) References Cited

U.S. PATENT DOCUMENTS

| | | | | |
|---|---|---|---|---|
| 7,529,255 B2* | 5/2009 | Zlateff | .............. | H04L 29/12009 370/400 |
| 9,430,648 B2* | 8/2016 | Jang | ........................ | H04W 4/80 |
| 2002/0161907 A1* | 10/2002 | Moon | ..................... | H04L 69/08 709/230 |
| 2006/0036847 A1* | 2/2006 | Bush | ....................... | H04L 67/08 713/153 |
| 2007/0201511 A1* | 8/2007 | Saito | ..................... | H04L 63/061 370/466 |
| 2014/0094121 A1* | 4/2014 | Ben-Shalom | ......... | H04L 63/164 455/41.2 |
| 2017/0070507 A1* | 3/2017 | Leconte | .................. | H04L 63/10 |
| 2017/0286357 A1* | 10/2017 | Chellappan | ......... | G06F 13/4286 |
| 2018/0260209 A1* | 9/2018 | Dooley | ................ | H04B 5/0031 |
| 2018/0330080 A1* | 11/2018 | Dong | .................... | G06F 21/602 |
| 2019/0392156 A1* | 12/2019 | Garlati | .................. | H04L 9/3247 |
| 2021/0034381 A1* | 2/2021 | Fong | .................... | G06F 21/572 |

* cited by examiner

*Primary Examiner* — David Bilodeau
(74) *Attorney, Agent, or Firm* — Fernando & Partners, LLP (57) ABSTRACT

In accordance with some embodiments, a first apparatus that provides protocol isolation includes a controller, one or more re-configurable data communication devices operable to provide alternative transport of data for a native data communication device on a second apparatus to an external device, and one or more data converters coupled to the one or more re-configurable data communication devices. The protocol isolation method performed by the first apparatus includes establishing a local communication channel with the second apparatus. The method further includes exchanging the data via the local communication channel with the second apparatus according to a first protocol. The method also includes converting the data to a second protocol different from the first protocol. The method additionally includes exchanging, via a first re-configurable data communication device of the one or more re-configurable data communication devices, the converted data with the external device according to the second protocol.

20 Claims, 5 Drawing Sheets

PROTOCOL ISOLATION FOR SECURITY

TECHNICAL FIELD

This relates generally to the field of electronic device, and more specifically to an apparatus with protocol isolators for security.

BACKGROUND

Native resources, e.g., memory, a processor, a sensor, a data communication device, etc., are central to the operation of electronic devices. In standard electronic device architectures, for performance consideration, a component is often granted direct access to the native resources. For example, Direct Memory Access (DMA) to an electronic device's memory is often given to high-speed USB and Wi-Fi chipsets. However, allowing direct access to the native resources may allow bypass of operating system supervision and/or security mechanisms, thus creating security vulnerabilities to be exploited by various forms of cyberattacks.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DETAILED DESCRIPTION

In accordance with various embodiments, a safe case disclosed herein addresses the aforementioned security issues and protects resources (e.g., memory and/or processor, etc.) on electronic devices. In some embodiments, the safe case includes one or more non-native resources, including one or more re-configurable data communication devices. The one or more re-configurable data communication devices provide alternative transport of data, e.g., each serving as a secure proxy for a native resource on an electronic device. As explained above, for performance considerations, direct access to native resources (e.g., memory and/or processor, etc.) is often granted to a native data communication component on an electronic device. In order to protect private information on the electronic device, in some embodiments, the safe case disables the native data communication component. As a result, the native data communication component would no longer have direct access to the native resources on the electronic device. Instead of using the native data communication component for direct communication with an external device, one or more non-native resources (e.g., one or more non-native data communication components) on the safe case communicate with the external device and relay messages to the electronic device.

In addition to using the one or more non-native data communication components along the communication path between the electronic device and the external device, in some embodiments, the safe case includes one or more data converters that are coupled to the one or more non-native data communication components. The safe case further includes a controller, which manages the communication path, including the one or more non-native data communication components and the one or more data converters. The one or more non-native data communication components and the one or more data converters form one or more protocol breaks along the communication path. In some embodiments, the connection between the controller and each of the one or more non-native data communication components includes a non-Direct Memory Access (DMA) connection and/or a data converter. As such, the controller is not opening up to a DMA attack, while still able to manage, control, and/or configure the one or more non-native data communication components.

In a scenario where the electronic device is compromised, the payload from the native resource(s) to the non-native resource(s) may include malicious codes, e.g., malicious control messages formatted according to a particular protocol attempting to control the non-native resource(s) on the safe case. With the one or more protocol breaks along the communication path, the malicious control messages would not be able to control the one or more non-native resources. Accordingly, the safe case disclosed herein provides protocol isolation of the electronic device to improve security and user privacy protection.

In accordance with some embodiments, a method is performed at a first apparatus including a controller, one or more re-configurable data communication devices operable to provide alternative transport of data for a native data communication device on a second apparatus to an external device, and one or more data converters coupled to the one or more re-configurable data communication devices. The method includes establishing a local communication channel with the second apparatus. The method also includes exchanging the data via the local communication channel with the second apparatus according to a first protocol. The method further includes converting the data to a second protocol different from the first protocol. The method additionally includes exchanging, via a first re-configurable data communication device of the one or more re-configurable data communication devices, the converted data with the external device according to the second protocol.

In accordance with some embodiments, a device includes one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a device, cause the device to perform or cause performance of the operations of any of the methods described herein. In accordance with some embodiments, a device includes means for performing or causing performance of the operations of any of the methods described herein.

In accordance with some embodiments, a device includes one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a device, cause the device to perform or cause performance of the operations of any of the methods described herein. In accordance with some embodiments, a device includes means for performing or causing performance of the operations of any of the methods described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

It should be appreciated that in the development of any actual embodiment (as in any development project), numerous decisions must be made to achieve the developers' specific goals (e.g., compliance with system and business-related constraints), and that these goals will vary from one embodiment to another. It will also be appreciated that such development efforts might be complex and time consuming, but would nevertheless be a routine undertaking for those of ordinary skill in the art of image capture having the benefit of this disclosure.

Figure 1:
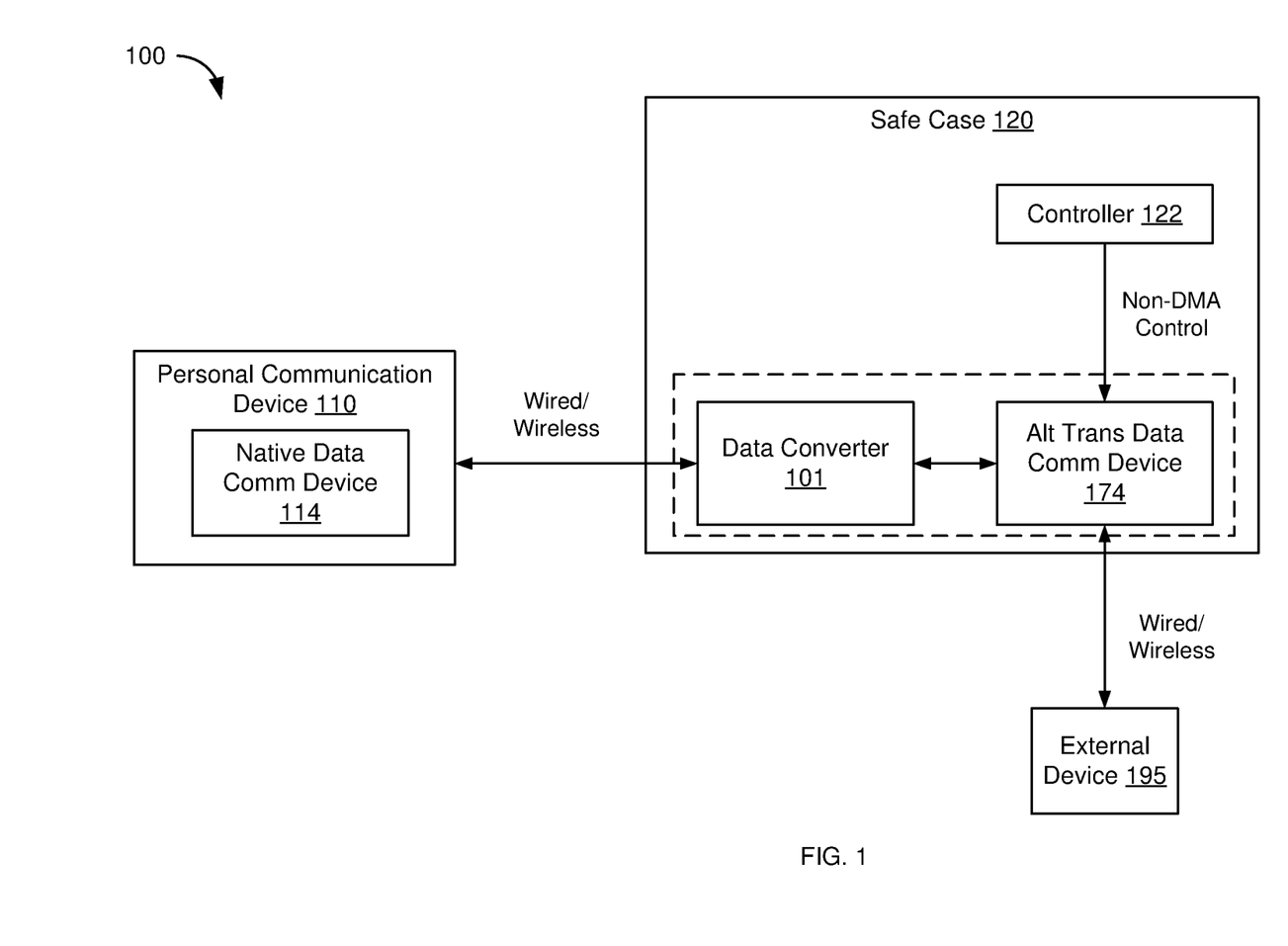
FIG. 1 is a block diagram of an exemplary protocol isolation operating environment in accordance with some embodiments.

Referring to FIG. 1, an exemplary protocol isolation operating environment 100 is illustrated, in accordance with some embodiments. In FIG. 1, an electronic device, such as a personal communication device 110, includes on-device resources (also known as native resources), including one or more native data communication devices 114, e.g., a Wi-Fi chipset, a Bluetooth (BT)/Bluetooth Low Energy (BLE) chipset, a Near Field Communication (NFC) chipset, a Global Positioning System (GPS), a cellular communication chipset, a Universal Serial Bus (USB) chipset, an High Definition Multimedia Interface (HDMI) chipset, and/or a Lightning® (a registered trademark of Apple Inc. of Cupertino, Calif.) connection chipset, among others. In some embodiments, the native resources also include on-device storage, sensors, input/output devices, and processors. The one or more native data communication devices 114 are capable of obtaining data (including private information) from the personal communication device 110 and transmitting the data. Once compromised, the one or more native data communication devices 114 are further capable of controlling and/or accessing other native resources, such as the on-device storage, sensors, input/output devices, and/or processors.

In some embodiments, in order to protect the data and/or the native resources, a safe case 120 holds or pairs with the personal communication device 110. Through a wired or wireless connection, e.g., pairing or connecting communication device(s) on the personal communication device 110 with local communication device(s) on the safe case 120, a controller 122 of the safe case 120 facilitates establishing a local communication channel between the personal communication device 110 and the safe case 120. In some embodiments, through the local communication channel, the controller 122 causes or directs disablement of the native data communication device (e.g., configuring the personal communication device 110 in an airplane mode) or placement the native data communication device in a low power mode (e.g., in order to limit the range of RF energy transmission).

In some embodiments, instead of using the one or more native data communication devices 114, the safe case 120 includes a re-configurable data communication device 101 to communicate with an external device 195 on behalf of or supplementing the native data communication device 114. As such, the re-configurable data communication device 101 on the safe case 120 is a non-native data communication device that provides alternative transport of data for the personal communication device 110 or serves as a proxy for the native data communication device 114. Accordingly, the re-configurable data communication device 101 is also referred to as a non-native data communication device, a non-native resource, or an alternative transport data communication device. In such embodiments, the controller 122 manages the communication path and/or coordinates communications carried out by the alternative transport data communication device 174.

Using an alternative transport data communication device 174 on the safe case 120 for communication has several benefits. As explained above, unchecked access (e.g., Direct Memory Access (DMA)) to native resources creates security vulnerabilities. In particular, native data communication devices are susceptible to various forms of cyberattacks. For example, in order to establish a Wi-Fi connection to a Wi-Fi access point (AP) (e.g., the external device 195), the affiliation of the Wi-Fi chipset on the personal communication device 110 to the AP often involves assigning, exchanging, and/or using secret keys and/or certificates. By removing the establishment of communication from the personal communication device 110 and managing it from the controller 122, the possibility that the compromised personal communication device 110 revealing the security information is reduced or eliminated.

In some embodiments, the communication path includes one or more data converters 101. The controller 122 manages the communication path between the personal communication device 110 and the external device 195. For instance, the controller 122 manages a segment of the communication path between the personal communication device 110 and the alternative transport data communication device 174 as well as the remote communication channel between the alternative transport data communication device 174 and the external device 195. In some embodiments, as shown in FIG. 1, the segment of the communication path between the personal communication device 110 and the alternative transport data communication device 174 includes a data converter 101. Along with the alternative transport data communication device 174, the data converter 101 provides a barrier (also referred to as a protocol break or a protocol isolator) for an attacker to cross.

For example, Wi-Fi is widely used due to its efficiency, convenience, and/or affordability, etc. In order to still allow for these characteristics of Wi-Fi to be realized, in some embodiments, the alternative transport data communication device 174 includes a Wi-Fi chipset to communicate with the external device 195. However, Wi-Fi is susceptible to various forms of cyberattacks. As such, adding an Ethernet and/or a USB driver as the data converter 101 along the communication path creates a protocol break. When malicious codes attempt to control the alternative transport data communication device 174 according to Wi-Fi protocol, because Ethernet and/or USB are different protocols from the Wi-Fi protocol, the malicious codes exploiting the Wi-Fi protocol would not be able to gain direct control to the alternative transport data communication device 174. As such, the Wi-Fi protocol isolation provided by the safe case 120, as indicated by the dotted box in FIG. 1, protects the resources on the safe case 120 as well as the resources on the personal communication device 110.

In some embodiments, for further security and protection of the non-native resources (e.g., processing, communication, and/or storage components) on the safe case 120, the controller 122 connects or couples to the alternative transport data communication device 174 through a non-Direct Memory Access (DMA) interface, e.g., a Secure Digital Input Output (SDIO) bus or an Inter-Integrated Circuit (I²C) bus, among others. In some embodiments, because the safe case 120 has other built-in security features (e.g., hardware root of trust, validation engine, continuous multifactor authentication, encryption, etc.), the access to the off-device resources is through a DMA interface for improved performance.

It should be noted that though FIG. 1 illustrates the data converter 101 as a separate component from the alternative transport data communication device 174, the data converter 101 can be located on the alternative transport data communication device 174 or combined with other components on the safe case 120. Further, though FIG. 1 illustrates a protocol isolation operating environment formed by the data converter 101 being connected to the personal communication device 110 and the alternative transport data communication device 174 being connected to the external device 195, embodiments of the protocol isolation operating environment include connecting the data converter 101 to the external device 195 and connecting the alternative transport data communication device 174 to the personal communication device 110. Additionally, embodiments of the data converter 101 include hardware, software, firmware, or a combination thereof. Likewise, embodiments of the alternative transport data communication device 174 include hardware, software, firmware, or a combination thereof.

Figure 2:
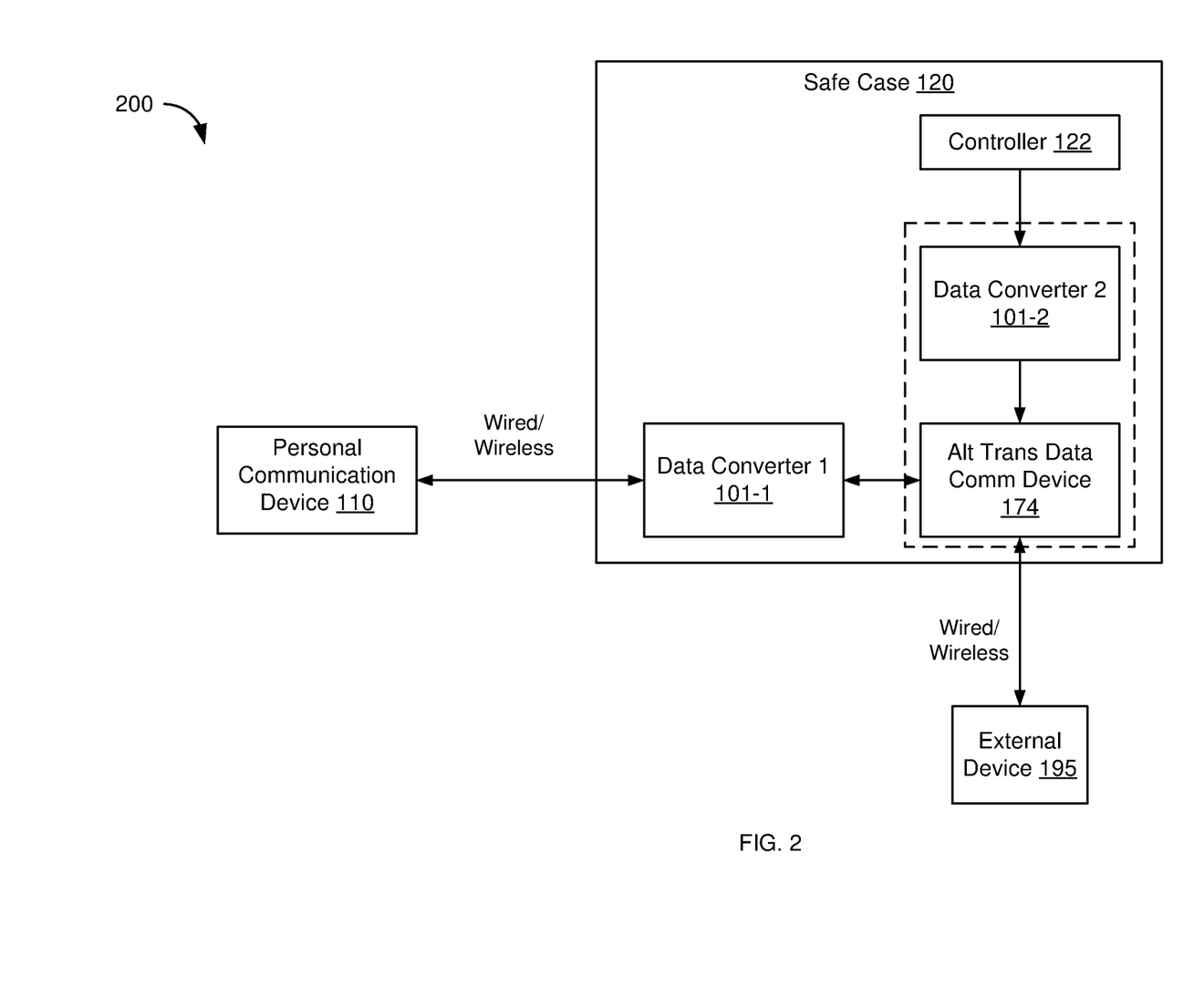
FIG. 2 is a block diagram of another exemplary protocol isolation operating environment in accordance with some embodiments.

Turning to FIG. 2, another exemplary protocol isolation operating environment 200 is illustrated, in accordance with some embodiments. The protocol isolation operating environment 200 is similar to and adapted from the operating environment 100 shown in FIG. 1. Elements common to these figures include common reference numbers, and the differences are described herein for the sake of brevity. To that end, in some embodiments, the safe case 120 includes more than one data converter 101, e.g., a first data converter 101-1 and a second data converter 101-2.

Along the communication path between the personal communication device 110 and the external device 195, the first data converter 101-1 is connectable to the personal communication device 110 and is connected or coupled to the alternative transport data communication device 174. In addition to the protocol isolation formed by including the first data converter 101-1 described above with reference to FIG. 1, an additional layer of protocol isolation, as indicated by the dotted box in FIG. 2, is formed by coupling the second data converter 101-2 to the controller 122 and the alternative transport data communication device 174 in accordance with some embodiments.

For example, when the alternative transport data communication device 174 is a USB hub, the second data converter 101-2 can be a USB protocol driver for emulating a serial port over USB between the controller 122 and the USB hub. Because the connection between the alternative transport data communication device 174 and the controller 122 is a non-DMA connection, the controller 122 is not open to DMA attack, while still being able to control and/or configure the alternative transport data communication device 174.

Figure 3:
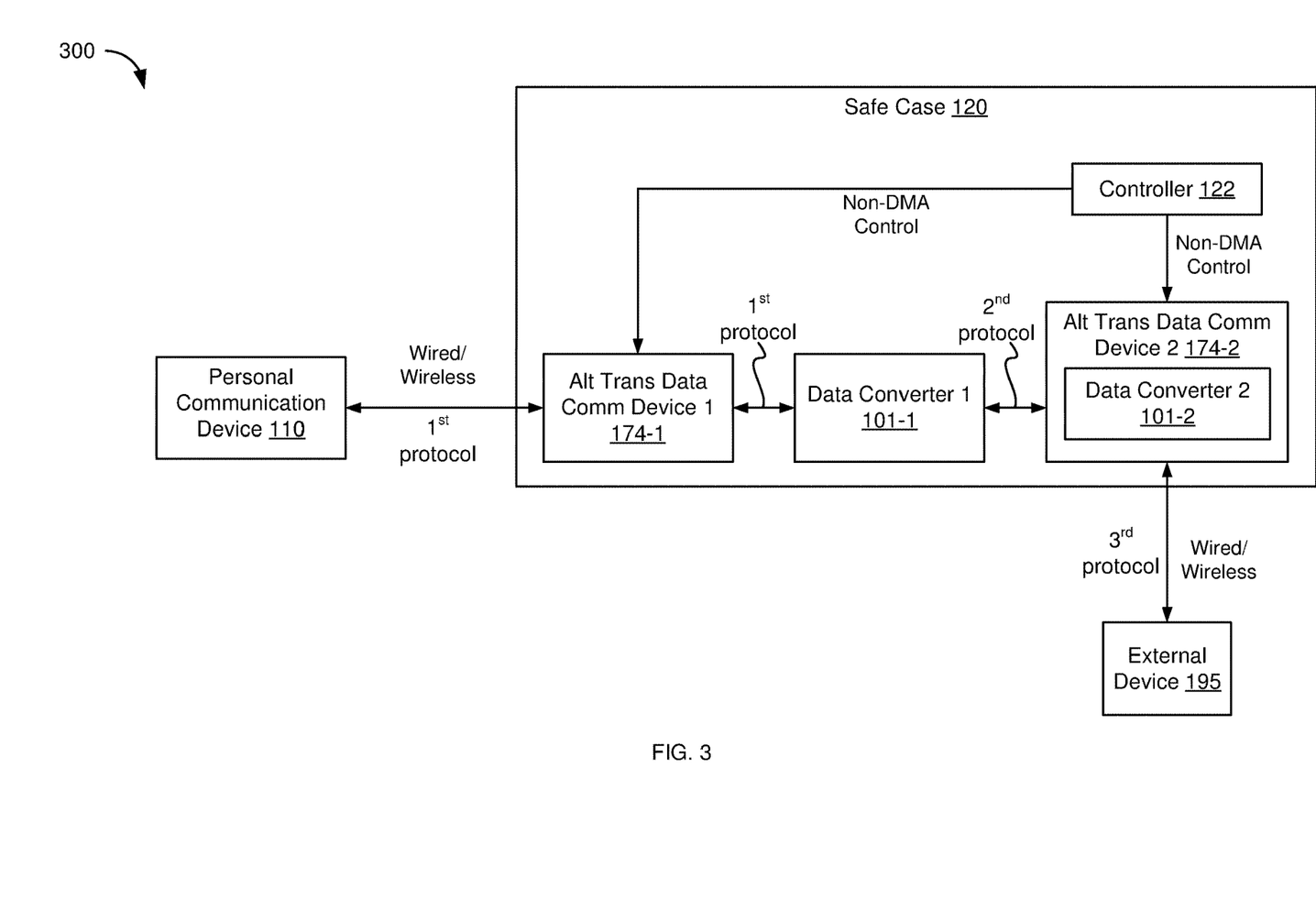
FIG. 3 is a block diagram of yet another exemplary protocol isolation operating environment in accordance with some embodiments.

Turning to FIG. 3, another exemplary protocol isolation operating environment 300 is illustrated, in accordance with some embodiments. The protocol isolation operating environment 300 is similar to and adapted from the operating environments 100 and 200 shown in FIGS. 1 and 2. Elements common to these figures include common reference numbers, and the differences are described herein for the sake of brevity. To that end, in some embodiments, the safe case 120 includes more than one alternative transport data communication device 174 (e.g., a first alternative transport data communication device 174-1 and a second alternative transport data communication device 174-2) and more than one data converter 101 (e.g., a first data converter 101-1 and a second data converter 101-2).

In FIG. 3, the first data converter 101-1 is coupled or connected to the first alternative transport data communication device 174-1. Further, the first data converter 101-1 is coupled or connected to the second alternative transport data communication device 174-2. The controller 122 connects or couples to the first alternative transport data communication device 174-1 via a non-DMA control line. Likewise, the controller 122 also connects or coupled to the second alternative transport data communication device 174-2 via a non-DMA control line. Through the non-DMA control lines, the controller 122 manages the communication path between the personal communication device 110 and the external device 195, where the communication path has more than one protocol breaks.

In one direction along the communication path, the first alternative transport data communication device 174-1 communicates with the personal communication device 110 through a local communication channel (wired or wireless) according to a first protocol. The first data converter 101-1 converts the messages received by the first alternative transport data communication device 174-1 to a second protocol that is different from the first protocol. Further along the communication path, in some embodiments, the second alternative transport data communication device 174-2 includes the second data converter 101-2. As such, the second data converter 101-2 converts the messages received by the second alternative transport data communication device 174-2 to a third protocol that is different from the second protocol and communicates the converted messages to the external device 195.

In another direction along the communication path, the second alternative transport data communication device 174-2 receives messages from the external device 195 according to the third protocol. The second data converter 101-2 converts the received messages to the second protocol. Further, the first data converter 101-1 converts the messages from the second alternative transport data communication device 174-1 to a first protocol. The converted messages according to the first protocol are then communicated by the first alternative transport data communication device 174-1 to the personal communication device 110 through the local communication channel. It should be noted that in some embodiments, the first protocol, the second protocol, and the third protocol are different from each other. In some embodiments, with multiple data converters, the first protocol and the third protocol can be the same, e.g., one data converter to convert between Bluetooth and USB and another data converter to convert between USB and Bluetooth.

The protocol breaks formed by the alternative data communication devices 174 and data converters 101 protect the resources on the personal communication device 110 while still providing connectivity to the personal communication device 110. For example, in order to establish a Wi-Fi connection, through a USB connection, the safe case 120 establishes a secure local communication channel with the personal communication device 110. In some embodiments, the first alternative transport data communication device 174-1 includes a USB hub. In such embodiments, the first data converter 101-1 includes an Ethernet/USB data converter to convert data between USB protocol and Ethernet protocol. As such, one layer of protocol isolation is formed by the Ethernet/USB data converter and/or the USB hub. Further, in some embodiments, the second alternative transport data communication device 174-2 includes an Ethernet to Wi-Fi bridge chipset that provides another layer of protocol isolation. As is known in the art, an Ethernet to Wi-Fi bridge can connect to a wireless network and converts data between Wi-Fi protocol and Ethernet protocol. As a result, two protocol breaks are formed between the external device 195 and the personal communication device 110, e.g., one protocol break formed by USB/Ethernet conversion and another protocol break formed by Ethernet/Wi-Fi conversion. With the two protocol breaks, the malicious codes that exploit the security vulnerability of the Wi-Fi protocol would not be able to gain control of the second alternative transport data communication device 174 or to obtain private information from the personal communication device 110 and/or the safe case 120. Accordingly, the safe case 120 allows for the characteristics of Wi-Fi (e.g., efficiency, convenience, and/or affordability, etc.) to be realized while enhancing the security and privacy protection.

Figure 4:
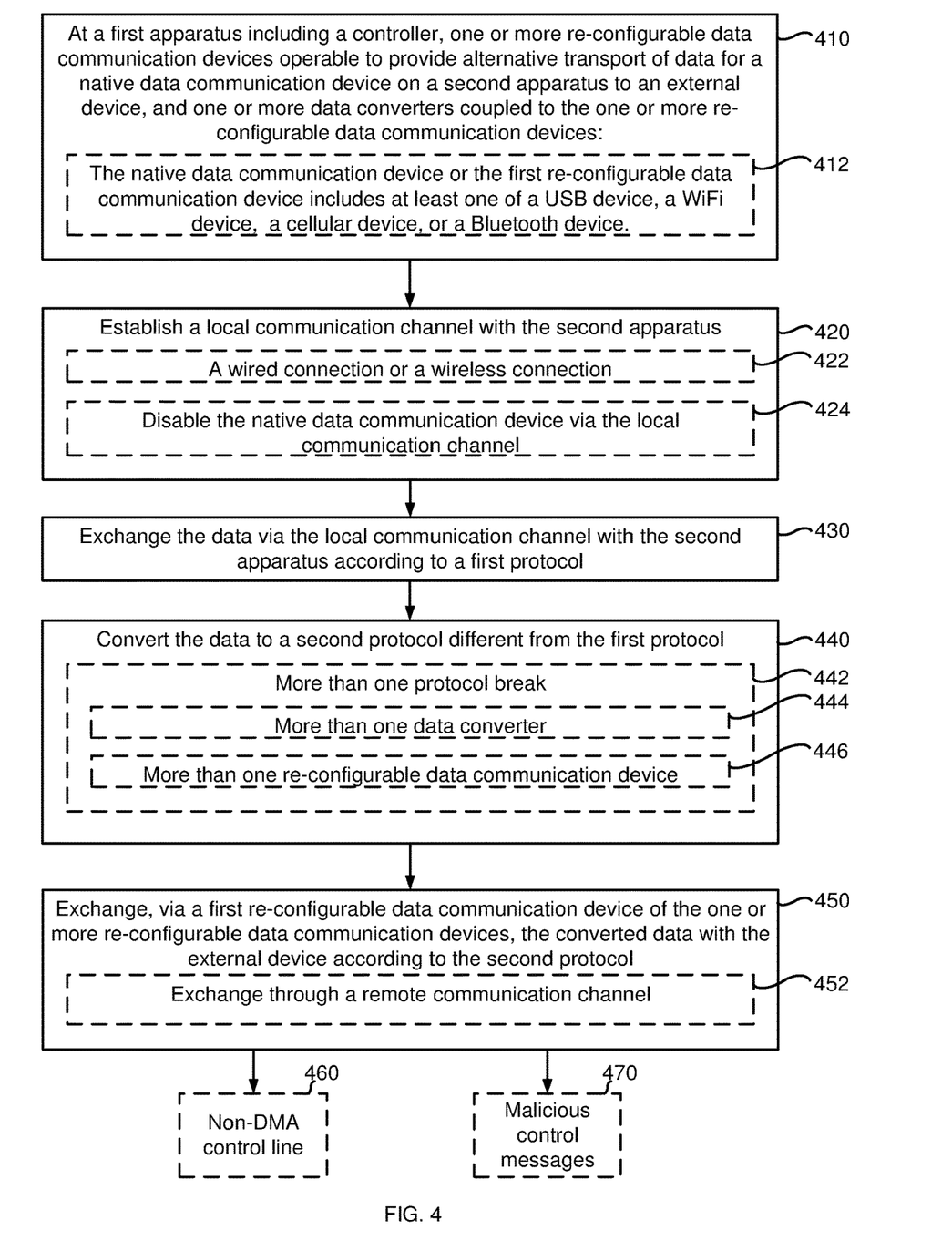
FIG. 4 is a flowchart illustrating a protocol isolation method in accordance with some embodiments.

FIG. 4 is a flowchart representation of a protocol isolation method 400, in accordance with some embodiments. In some embodiments, as represented by block 410, the protocol isolation method 400 is performed at a first apparatus (e.g., the safe case 120, FIGS. 1-3) including a controller (e.g., the controller 122, FIGS. 1-3), one or more re-configurable data communication devices (e.g., the alternative transport data communication device(s) 174, FIGS. 1-3) operable to provide alternative transport of data for a native data communication device (e.g., the native data communication device 114, FIG. 1) on a second apparatus (e.g., the personal communication device 110, FIGS. 1-3) to an external device (e.g., the external device 195, FIGS. 1-3), and one or more data converters (e.g., the data converter(s) 101, FIGS. 1-3) coupled to the one or more re-configurable data communication devices. In some embodiments, as represented by block 412, the native data communication device or the first re-configurable data communication device includes at least one of a USB device, a Wi-Fi device, a cellular device, or a Bluetooth device. Briefly, the method 400 includes establishing a local communication channel with the second apparatus; exchanging the data via the local communication channel with the second apparatus according to a first protocol; converting the data to a second protocol different from the first protocol; and exchanging, via a first re-configurable data communication device of the one or more re-configurable data communication devices, the converted data with the external device according to the second protocol.

To that end, as represented by block 420, the method 400 includes establishing a local communication channel with the second apparatus. In some embodiments, as represented by block 422, the local communication channel is through a wired connection (e.g., a USB connection) or a wireless connection (e.g., a BT/BLE connection). Further in some embodiments, as represented by block 424, the method 400 further includes directing by the controller, via the local communication channel, the second apparatus to disable the native data communication device, e.g., placing the second apparatus in an airplane mode or in a lower power mode to limit the range of communication signal.

As represented by block 430, the method 400 further includes exchanging the data via the local communication channel with the second apparatus according to a first protocol (e.g., USB, Ethernet, etc.). Further, as represented by block 440, the method 400 includes converting the data to a second protocol (e.g., Ethernet, Wi-Fi, etc.) different from the first protocol.

In some embodiments, as represented by block 442, the protocol isolation method 400 includes establishing more than one protocol breaks. In such embodiments, converting the data to the second protocol different from the first protocol includes converting the data according to a third protocol (e.g., Ethernet) to generate a first set of data (e.g., converting the data formatted according to USB protocol to the first set of data formatted according to Ethernet protocol); and converting the first set of data according to the second protocol to generate the converted data (e.g., converting the first set of data formatted according to Ethernet protocol to Wi-Fi protocol). In some embodiments, as represented by block 444, the more than one protocol break is established through more than one data converter. In such embodiments, converting the data according to the third protocol is performed by a first data converter (e.g., a USB/Ethernet data converter) of the one or more data converters and converting the first set of data according to the second protocol is performed by a second data converter (e.g., an Ethernet/Wi-Fi data converter) of the one or more data converters, different from the first data converter. In some embodiments, as represented by block 446, the more than one protocol break is established through more than one re-configurable data communication device. In such embodiments, at least one of converting the data according to the third protocol or converting the first set of data according to the second protocol is performed by a second re-configurable data communication device of the one or more re-configurable data communication devices; and the second re-configurable data communication device includes a data converter of the one or more data converters. For example, as shown in FIG. 3, the second alternative transport data communication device 174-2 includes the second data converter 101-2 for converting the data between two different protocols.

Still referring to FIG. 4, as represented by block 450, the method 400 further includes exchanging, via a first re-configurable data communication device of the one or more re-configurable data communication devices, the converted data with the external device according to the second protocol. In some embodiments, as represented by block 452, exchanging the converted data with the external device according to the second protocol includes establishing, via the first re-configurable data communication device of the one or more re-configurable data communication devices, a remote communication channel with the external device according to the second protocol; and exchanging the converted data with the external device through the remote communication channel. For example, in FIGS. 1-3, the safe case 120 establishes a remote communication channel (wirelessly or through a wired connection) with the external device 195 and the alternative transport data communication device 174 communicates with the external device 195 through the remote communication channel.

In some embodiments, as represented by block 460, the method 400 further includes exchanging messages between the controller and the first re-configurable data communication device via a non-DMA channel. The non-DMA channel, for example, can be a SDIO bus or an I²C bus. In some embodiments, the non-DMA channel includes a data converter (e.g., the data converter 101-2, FIG. 2) that provides a protocol break.

In some embodiments, as represented by block 470, the data transported by the first apparatus (e.g., the safe case 120, FIGS. 1-3) includes malicious control messages according to the second protocol for controlling the first re-configurable data communication device. As explained above with reference to FIGS. 1-3, because the safe case 120 includes one or more layers of protocol isolation, the malicious control messages according to the second protocol would not be able to control the first re-configurable data communication.

Figure 5:
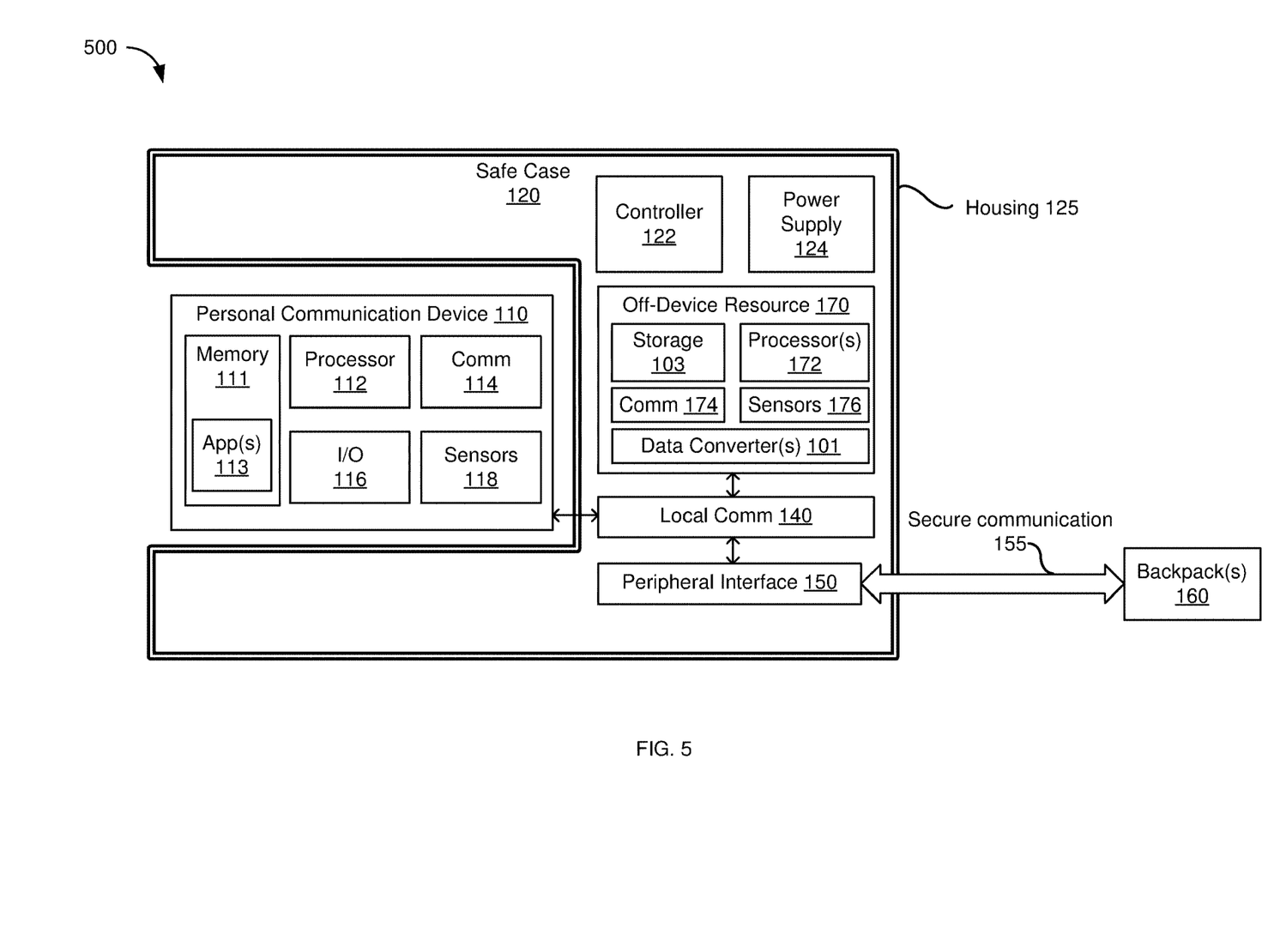
FIG. 5 is a block diagram illustrating exemplary devices and components in the protocol isolation operating environment in accordance with some embodiments.

FIG. 5 a simplified block diagram 500 illustrating the safe case 120 for protocol isolation in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the safe case 120 includes a housing 125 arranged to hold the personal communication device 110 (e.g., a smartphone, a wearable, a tablet, etc.). In some embodiments, the housing 125 supports at least one local communication device 140, so that the safe case 120 does not hold the personal communication device 110, but pairs with the personal communication device 110 through wired connections or wirelessly.

Different from a conventional base or case that merely provides structural support of another device, the safe base 120 actively monitors and analyzes the personal communication device 110 in order to determine whether the personal communication device 110 is a compromised device and takes appropriate actions to protect the personal communication device 110 against potential intrusion. As such, when the personal communication device 110 is protected by the safe case 120, the safe case 120 enhances the security of the personal communication device 110.

In some embodiments, the housing 125 includes a plurality of moveable components mateable with another. In other words, the plurality of components, once mated with one another, form a housing assembly to hold the personal communication device 110. The housing assembly allows a user to insert the personal communication device 110 into the safe case 120 for more protection of work-related sensitive information (e.g., in a work mode) or take the personal communication device 110 out of the safe case 120 for less monitoring of the personal communication by enterprise (e.g., in a personal mode).

In some embodiments, the housing 125 includes one or more moveable components (e.g., a hood) operable to slide to one or more positions (e.g., up or down) as well as non-moveable components. In such embodiments, the one or more moveable components, when in a first position (e.g., hood pushed down), are mateable (e.g., mechanically and/or electrically) with the non-moving components to form a housing assembly. The housing assembly forms an enclosure that at least partially supports and holds the personal communication device 110, e.g., a partial enclosure as shown in FIG. 5 or a whole enclosure encapsulating the personal communication device 110. When in the first position, the housing 125, along with other components of the safe case 120, protects the personal communication device 110 against tracking or spying, e.g., by audio jamming, camera covering, and/or RF shielding, etc. When the one or more moveable components of the housing assembly are in a second position (e.g., hood slid up), a user can take the personal communication device 110 out of the housing 125 and place the personal communication device 110 in a non-protected mode.

In some embodiments, the personal communication device 110 held by the safe case 120 includes a processor 112, one or more communication devices 114, input/output devices 116, one or more sensors 118, and memory 111 for storing data as well as instructions associated with one or more applications 113 executed by the processor 112. In some embodiments, the input/output devices 116 include a display (including a touch screen display), a touch-sensitive surface, a keyboard (virtual or physical), a mouse, a pen, microphones, cameras, and/or speakers. In some embodiments, the one or more communication devices 114 connect the personal communication device 110 and another electronic device wirelessly (e.g., using wireless modem) or through a wired connection.

For example, the one or more communication devices 114 connect to the safe case 120 wirelessly or through a wired communication. The wireless communication includes at least one of, for example, Wi-Fi (e.g., IEEE 802.11a, IEEE 802.11b, IEEE 802.11g, IEEE 802.11n, and/or IEEE 802.11ac), BT/BLE, NFC, GPS, and/or cellular communication, including but not limited to Long-Term Evolution (LTE), Wideband Code Division Multiple Access (W-CDMA), code division multiple access (CDMA), time division multiple access (TDMA), or Global System for Mobile Communications (GSM). The wired connections include at least one of, for example, a USB connector, a High Definition Multimedia Interface (HDMI) connector, and/or a Lightning® (a registered trademark of Apple Inc. of Cupertino, Calif.) connector.

In some embodiments, the personal communication device 110 includes one or more sensors 118, including but not limited to biometric sensor(s), motion sensor(s), accelerometers, gyroscopes, and/or magnetometers (e.g., as part of an inertial measurement unit (IMU)) for obtaining information concerning the position (e.g., altitude) of the personal communication device 110. In some embodiments, the sensors 118 are coupled to the input/output devices 116, e.g., touch sensors and/or force sensors coupled to a touch sensitive surface, sound or acoustic sensors coupled to a microphone, or light sensors coupled to a camera. In some embodiments, the one or more sensors 118 are coupled to the one or more communication devices 114, so that the sensor data collected by the sensors 118 can be transmitted to another device (e.g., to the safe case 120 via a communication interface).

As used herein, the memory 111, the processor 112, the I/O devices 116, the communication component 114, and the sensors 118 are collectively referred to as native or on-device resource. In some embodiments, the safe case 120 includes at least one off-device resource 170 supported by the housing 125. The at least one off-device resource 170 provides an alternative (e.g., replacing or supplementing) to a corresponding on-device resource integrated within the personal communication device 110. As such, relative to the native resources or on-device resources as part of the personal communication device 110, the at least one off-device resource 170 is also referred to as non-native or alternative transport components. For example, the at least one off-device resource 170 can include one or more data converters 101, one or more processors 172, storage 103 (including non-transitory memory), and/or communication component(s) 174 (e.g., cellular, GPS, Wi-Fi, LoRa, etc.). Though not shown FIG. 5, in some embodiments, the storage 103 includes a validation engine that validates the operational characteristics of the native resources on the personal communication device 110 as well as the operational parameter configurations of the off-device resources 170. The controller 122 uses the validation results generated by the validation engine to determine whether to re-configure the off-device resources 170.

In some embodiments, the controller 122 has physical access to the off-device resources 170. For example, the controller 122 has access to the storage 103 in order to obtain firmware images and/or policies stored in the storage 103. In another example, the controller 122 has access to the sensor data obtained by the sensors 176 in order to determine the context for applying re-configuration policies. In yet another example, the controller 122 has access to the communication components 174 for loading the firmware image(s) retrieved from the storage 103. In some embodiments, the access to the off-device resources 170 is through a non-DMA interface, e.g., a Secure Digital Input Output (SDIO) bus or an Inter-Integrated Circuit (I²C) bus, among others. In some embodiments, because the safe case 120 has built in security features, the access to the off-device resources 170 is through a DMA interface for improved performance.

In some embodiments, the at least one off-device resource 170 is re-configurable. In particular, when the at least one off-device resource 170 is associated with data communication, the at least one off-device resource 170 is also referred to as a re-configurable data communication device. In some embodiments, the at least one off-device resource 170 can replace or supplement on-device resources, such as the processor 112, the memory 111, and/or the communication device(s) 114 of the personal communication device 110.

For instance, the communication device 174 (e.g., cellular, Wi-Fi, LoRa, etc.), which is at least partially supported by the housing 125, is operable to serve as a proxy for the communication device 114 and provide a communication channel between the personal communication device 110 and a remote or external device (e.g., a device connected through a USB connector, a base station, an eNodeB, or a Wi-Fi AP, etc.). In such embodiments, the controller 122 has physical access to the communication device 174, which is the re-configurable data communication device in accordance with some embodiments, and manages the re-configuration of the communication device 174 for security and privacy protection.

In some embodiments, the safe case 120 includes a peripheral interface 150 (e.g., a backpack interface) to connect to the supplemental functional device (e.g., the backpack 160). A supplemental functional device, as described herein, is a device connectable to the personal communication device 110 through the safe case 120 and provides supplemental functional functions to the personal communication device 110. In some embodiments, the supplemental functional device 160 is a modular and detachable device. In some embodiments, the supplemental functional device 160 snaps onto the back of the safe case 120 in order to be connected to the safe case 120 for added functionality.

The supplemental functional device 160 allows additional hardware and software functionality to be provided to a user of the personal communication device 110 and/or the safe case 120. As such, the supplemental functional device 160 supplements the functionality of the personal communication device 110 and/or the safe case 120. In some embodiments, the resources providing the supplemental functionality on the supplemental functional device 160 are also referred to as off-device resources. For instance, the supplemental functional device 160 can include sensors and/or processors for detecting odor, RF energy, biometric markers, etc. In another example, the supplemental functional device 160 can include a communication component for translating and relaying communication messages and acts as a proxy for the personal communication device 110 and/or the safe case 120. When components of the supplemental functional device 160 provide data communication functionality, the components can also be used as re-configurable data communication device. Further, in various embodiments, the supplemental functional device 160 also includes one or more data converters to provide protocol isolation.

In some embodiments, the supplemental functional device 160 is connected to the safe case 120 through its peripheral interface, which is connectable to the peripheral interface 150 on the safe case 120. In some embodiments, the peripheral interface 150 connects the supplemental functional device 160 to the safe case 120 and the local communication device 140 further connects the peripheral interface 150 to the personal communication device 110. To enable the connection to the supplemental functional device 160, the housing 125 at least partially supports the peripheral interface 150.

For example, the peripheral interface 150 can include a number of connectors (e.g., contact pins or contact pads as indicated by the dots) connectable to the supplemental functional device 160. In some embodiments, the connectors are affixed to the housing 125 and at least partially supported by the housing 125. The connectors are mateable to the interface of the supplemental functional device 160. In some embodiments, the peripheral interface 150 is wholly supported by the housing 125, such that the peripheral interface 150 is integrated with or embedded in the housing 125 surface. In such embodiments, connectors from the supplemental functional device 160 can be plugged into the peripheral interface 150 in order to connect the supplemental functional device 160 to the safe case 120. In some embodiments, the peripheral interface 150 is operable to communicate with the supplemental functional device 160 via a physical channel established through the connectors. The physical channel forms a secure channel 155 for communication between the safe case 120 and the supplemental functional device 160. In some embodiments, through the secure channel 155, the controller 122 has access to the re-configurable data communication device and directs the re-configuration of the re-configurable data communication device for added security and privacy protection.

It should be noted that the peripheral interface 150 is not limited to physical connectors, in some embodiments, the peripheral interface 150 is a wireless interface. In some embodiments, the peripheral interface 150 includes a wireless modem operable to wirelessly communicate with the supplemental functional device 160. In some embodiments, the peripheral interface 150 leverages the wireless communication capability of the local communication device 140 to communicate with the supplemental functional device 160. For example, the safe case 120 can connect to a wireless communication enabled supplemental functional device 160 through a wireless peripheral interface 150 or through a wireless modem of the local communication device 140. As such, a wireless communication-enabled supplemental functional device 160 can communicate with the safe case 120 without being in contact with the housing 125 or physically connected to the peripheral interface 150. Further, it should be noted that at least some components of the supplemental functional device 160 can be integrated into the safe case 120 or vice versa. Accordingly, at least some supplemental functions provided by the supplemental functional device 160 can also be provided by the safe case 120.

Still referring to FIG. 5, in some embodiments, the safe case 120 includes a local communication device 140 coupled to the peripheral interface 150 and supported by the housing 125. In some embodiments, the local communication device 140 includes components, such as a personal communication device interface modem (e.g., a Wi-Fi modem, a BT/BLE radio, an infrared radio, an NFC radio, a Lightning® (a registered trademark of Apple Inc., Cupertino, Calif.) connector, etc.) operable to provide a communication channel (e.g., wirelessly or via physical connection) between the peripheral interface 150 and the personal communication device 110. In one direction, the communication channel carries information from the personal communication device 110 to the safe case 120. In the other direction, the communication channel (e.g., a secure communication channel 155) carries information from the supplemental functional device 160 via the peripheral interface 150 to the personal communication device 110 in order to supplement the functionality of the personal communication device 110.

In some embodiments, the at least one off-device 170 is coupled to the local communication device 140 (e.g., Wi-Fi, BT/BLE, infrared, NFC, a Lightning® (a registered trademark of Apple Inc., Cupertino, Calif.) connector, etc.). In some embodiments, the local communication device 140 includes a personal communication device interface modem (e.g., a Wi-Fi modem, BT/BLE radio, infrared radio, NFC radio, a Lightning® (a registered trademark of Apple Inc., Cupertino, Calif.) connector, etc.) operable to provide a communication channel (e.g., wirelessly or via physical connection) between the at least one off-device resource 140 and the personal communication device 110.

In some embodiments, the safe case 120 includes the controller 122 coupled to the peripheral interface 150, the at least one off-device resource 170, and/or the local communication device 140. Embodiments of the controller 122 include hardware, software, firmware, or a combination thereof. In some embodiments, the controller 122 is operable to manage the data plane and/or control plane of the communication path among the safe case 120, the personal communication device 110, and the supplemental functional device 160.

For instance, the controller 122 is operable to manage the communication channel between the personal communication device 110 and the supplemental functional device 160 through the local communication device 140 and the peripheral interface 150. In other words, the controller 122 manages a segment of the communication channel between the personal communication device 110 and the safe case 120 through the management of the local communication device 140, and the controller 122 manages a segment of the communication channel between the safe case 120 and the supplemental functional device 160 through the management of the peripheral interface 150. In particular, with access to the native resources on the personal communication device 110 through the local communication channel, to the off-device resources 170, and/or components on the supplemental functional device 160, the controller 122 can re-configure the native resources (e.g., directing the personal communication device 110 to enter an airplane mode), the off-device resources 170 (e.g., re-configuring or re-flashing firmware images, managing the communication path for protocol isolation), and/or the components on the supplemental functional device 160 for security and protection in accordance with some embodiments.

In some embodiments, the safe case 120 includes a power supply 124. The power supply 124 supplies power to the peripheral interface 150, the local communication device 140, and the security management controller 122. In some embodiments, the power supply 124 includes at least one of a battery, a charging socket, a USB connector, a power plug, and/or a power socket. In some embodiments, the power supply 124 includes a connector for a battery.

The foregoing description, for purpose of explanation, has been described with reference to specific embodiments.

However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. An apparatus comprising:
a first re-configurable data communication device operable to provide alternative transport of data for a native data communication device on a second device;
a first data converter, coupled to the first re-configurable data communication device, operable to convert between a first protocol and a second protocol different from the first protocol;
a controller, connected to the first re-configurable data communication device, operable to manage alternative transport of the data between the second device and an external device through the first re-configurable data communication device and the first data converter; and
a housing arranged to at least partially support the first re-configurable data communication device, the first data converter, and the controller.

2. The apparatus of claim 1, wherein the data includes malicious control messages according to the second protocol for controlling the first re-configurable data communication device.

3. The apparatus of claim 1, further comprising a second re-configurable data communication device connectable to the second device, and coupled to the first data converter, operable to provide alternative transport of the data for the native data communication device on the second device.

4. The apparatus of claim 1, wherein the native data communication device or the first re-configurable data communication device includes at least one of a Wi-Fi device, a cellular device, or a Bluetooth device.

5. The apparatus of claim 1, wherein the controller is connected to the first re-configurable data communication device via a non-Direct Memory Access (DMA) channel.

6. The apparatus of claim 1, wherein the controller is connected to the first re-configurable data communication device via a second data converter.

7. The apparatus of claim 1, wherein the first re-configurable data communication device includes a second data converter, the second data converter is operable to convert between the second protocol and a third protocol.

8. The apparatus of claim 1, further comprising a first communication device, at least partially supported by the housing, connectable to a second communication device on the second device in order to establish a local communication channel.

9. The apparatus of claim 8, wherein the local communication channel is through a wired connection or a wireless connection.

10. The apparatus of claim 8, wherein the controller is further operable to, via the local communication channel, disable the native data communication device on the second device.

11. A method comprising:
at a first apparatus including a controller, one or more re-configurable data communication devices operable to provide alternative transport of data for a native data communication device on a second apparatus to an external device, and one or more data converters coupled to the one or more re-configurable data communication devices:
establishing a local communication channel with the second apparatus;
exchanging the data via the local communication channel with the second apparatus according to a first protocol;
converting the data to a second protocol different from the first protocol; and
exchanging, via a first re-configurable data communication device of the one or more re-configurable data communication devices, the converted data with the external device according to the second protocol.

12. The method of claim 11, wherein the native data communication device or the first re-configurable data communication device includes at least one of a USB device, a Wi-Fi device, a cellular device, or a Bluetooth device.

13. The method of claim 11, wherein the local communication channel is through a wired connection or a wireless connection.

14. The method of claim 11, further comprising:
directing by the controller, via the local communication channel, the second apparatus to disable the native data communication device.

15. The method of claim 11, wherein converting the data to the second protocol different from the first protocol includes:
converting the data according to a third protocol to generate a first set of data; and
converting the first set of data according to the second protocol to generate the converted data.

16. The method of claim 15, wherein converting the data according to the third protocol is performed by a first data converter of the one or more data converters and converting the first set of data according to the second protocol is performed by a second data converter of the one or more data converters, different from the first data converter.

17. The method of claim 15, wherein:
at least one of converting the data according to the third protocol or converting the first set of data according to the second protocol is performed by a second re-configurable data communication device of the one or more re-configurable data communication devices, the second re-configurable data communication device including a data converter of the one or more data converters.

18. The method of claim 11, wherein exchanging the converted data with the external device according to the second protocol includes:
establishing, via the first re-configurable data communication device of the one or more re-configurable data communication devices, a remote communication channel with the external device according to the second protocol; and
exchanging the converted data with the external device through the remote communication channel.

19. The method of claim 11, further comprising:
exchanging messages between the controller and the first re-configurable data communication device via a non-DMA channel.

20. The method of claim 11, wherein the data includes malicious control messages according to the second protocol for controlling the first re-configurable data communication device.

* * * * *